US005285566A

United States Patent [19]

Marshall et al.

[11] Patent Number: 5,285,566

[45] Date of Patent: Feb. 15, 1994

[54] SYSTEM FOR ASSEMBLING CLOTHES HANGERS WITH INDEX-CODED CAPS

[75] Inventors: David J. Marshall, Victoria, Australia; Stanley Gouldson, Northport, N.Y.; John Mazza, Indianapolis, Minn.; Olaf Olk, Haupoague, N.Y.; Robert Maiorca, Syosset, N.Y.

[73] Assignee: Plasti-form Enterprises, Inc., Deer Park, N.Y.

[21] Appl. No.: 954,256

[22] Filed: Sep. 30, 1992

Related U.S. Application Data

[60] Division of Ser. No. 670,963, May 2, 1991, which is a continuation-in-part of Ser. No. 287,985, Dec. 20, 1988, abandoned.

[51] Int. Cl.$^5$ .......................... B23P 21/00; B23Q 7/10

[52] U.S. Cl. .......................................... 29/783; 29/789; 29/797; 29/809

[58] Field of Search ...................... 29/527.1, 433, 241, 29/822, 783, 771, 789, 790, 809, 791, 797; 414/755, 27, 908, 795.3; 198/392, 380; 411/339, 510; 248/74.3; 211/54.1

[56] References Cited

U.S. PATENT DOCUMENTS

| | | |
|---|---|---|
| D. 192,845 | 5/1962 | Cohen . |
| D. 244,197 | 5/1977 | Ostroll . |
| D. 264,912 | 6/1982 | Bliss et al. . |
| D. 302,214 | 7/1989 | Wilson . |
| 1,099,261 | 6/1914 | Lewyt . |
| 3,024,953 | 3/1962 | O'Keefe . |
| 3,341,031 | 9/1967 | Myers . |
| 3,457,693 | 7/1969 | Jackson . |
| 3,545,069 | 12/1970 | Krieger . |
| 3,734,268 | 5/1973 | Burger et al. . |
| 3,949,914 | 4/1976 | Ostroll . |
| 3,955,491 | 5/1976 | McMahon . |
| 4,006,547 | 2/1977 | Samuels et al. . |
| 4,006,812 | 2/1977 | Everett et al. . |
| 4,030,528 | 6/1977 | Horning . |
| 4,045,899 | 9/1977 | Richardson . |
| 4,115,940 | 9/1978 | Philipe . |
| 4,137,661 | 2/1979 | Johansson . |
| 4,172,513 | 10/1979 | Bradstreet et al. . |
| 4,322,902 | 4/1982 | Lenthall . |
| 4,335,987 | 6/1982 | Laxo . |
| 4,450,639 | 5/1984 | Deuster . |
| 4,714,156 | 12/1987 | Kolton et al. . |
| 4,830,172 | 5/1989 | Hilton et al. . |
| 4,863,078 | 9/1989 | Bengsch . |
| 4,886,195 | 12/1989 | Blanchard . |
| 5,065,852 | 11/1991 | Marti . |

FOREIGN PATENT DOCUMENTS

| | | |
|---|---|---|
| 42318/78 | 6/1979 | Australia . |
| 42320/78 | 6/1979 | Australia . |
| 55988/80 | 6/1980 | Australia . |
| 57011/80 | 10/1980 | Australia . |
| 26077/84 | 3/1983 | Australia . |
| 13313/83 | 11/1983 | Australia . |
| 32008/84 | 2/1985 | Australia . |
| 3401816 | 7/1985 | Fed. Rep. of Germany . |
| 518708 | 3/1972 | Switzerland . |
| 975548 | 11/1982 | U.S.S.R. . |
| 2010774A | 7/1979 | United Kingdom . |

*Primary Examiner*—P. W. Echols
*Assistant Examiner*—David P. Bryant
*Attorney, Agent, or Firm*—Scully, Scott, Murphy & Presser

[57] ABSTRACT

The specification discloses a system for producing and distributing index coded hangers to a plurality of locations, wherein the index indicia is correlated to the characteristics of the garment to be hung from the hanger at each of the plurality of locations. A unique hanger and index cap is disclosed, along with a method and means of making the same that is particularly adapted to high volume semi-automated operation. A device for assembling the index cap and hanger at the time the garment is hung is also disclosed.

The system contemplates the localized production of the index caps for improved control of batch color and other characteristics, with remote molding and assembly of the hangers at said plurality of remote locations.

13 Claims, 5 Drawing Sheets

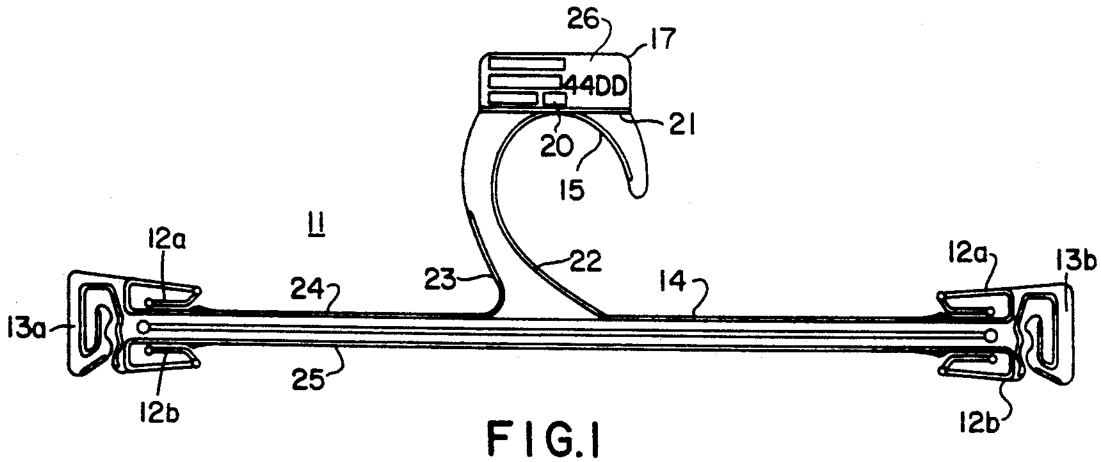
FIG.1
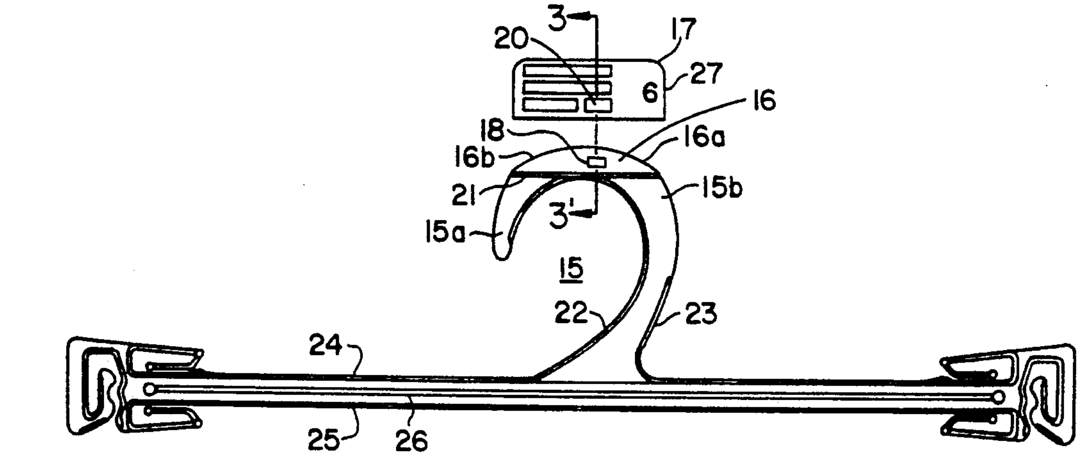
FIG.2
FIG.3
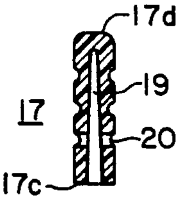
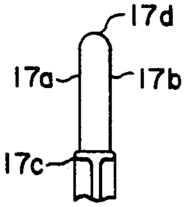
FIG.5
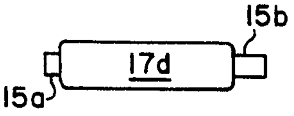
FIG.6
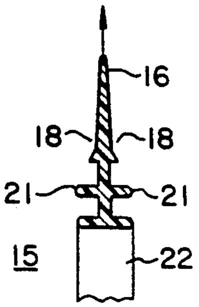
FIG.4

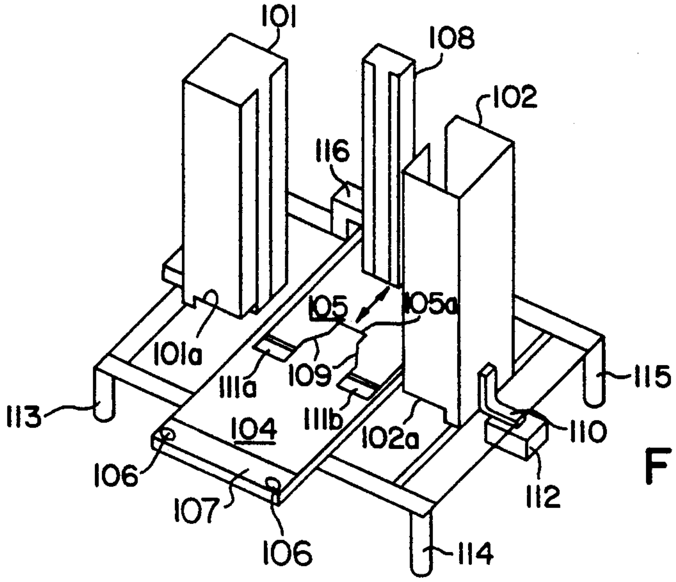
FIG.16
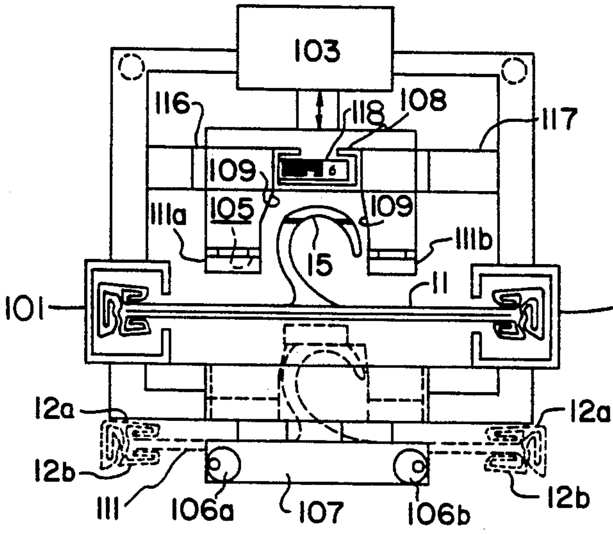
FIG.17
FIG.18
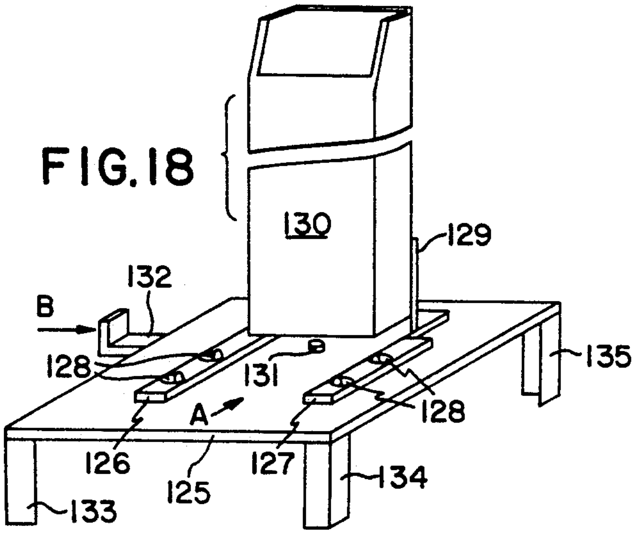
FIG.19
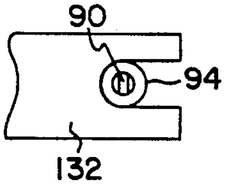
FIG.20
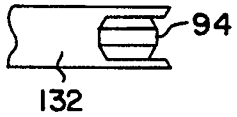

SYSTEM FOR ASSEMBLING CLOTHES HANGERS WITH INDEX-CODED CAPS

CROSS REFERENCE TO RELATED APPLICATIONS

This application is a division of application Ser. No. 670,963, filed on May 2, 1991, which is is a continuation-in-part of U.S. Ser. No. 287,985 filed Dec. 20, 1988 entitled Indicating Means For Hanger, now abandoned.

FIELD OF THE INVENTION

The present invention is applicable to the field of garment hangers from which clothing or other articles of apparel are suspended. In particular, it is a method and means for automatically affixing an indicating means to the hanger which identifies some attribute of the garment suspended therefrom, and includes a method, means and system for manufacturing and distributing the indicating means to a plurality of locations for attachment to said hangers.

DESCRIPTION OF THE PRIOR ART

It is known to affix an indicating means to a hanger to assist the buyer in locating a garment of a particular size from a plurality of like garments arranged adjacent thereto on a display rack. Consumer taste and fashion have dictated a desire for mass produced, but well fitted garments. For example, men's suits, commonly sold by chest measurement are now available for short, regular, tall, and extra tall proportions for a given size, thereby providing four different "attributes" for a given garment size, i.e., 42S, 42R, 42T, 42XT respectively. The manufacturers of women's garment, particularly those who manufacture bra and panty sets, have also experienced a comparable increase in the number of attributes allocated to a given garment, in addition to its size. For example, a bra with a chest size of 36 may be available in five different cup sizes (A–DD) and for certain types of lingerie, may be matched with one or more corresponding panty sizes.

For this reason, the trade has developed a variety of indexing means to further sub-divide garments by their appropriate attributes, all of which are today manually affixed.

For example, U.S. Pat. No. 4,322,902 discloses an indicator for garment hangers, which is currently assigned to the assignee of the present application, and which further discloses a first indicator which may be snapped over the wire hook of a hanger, and a second indicator, disclosed in FIGS. 3–6 which may be attached to either a wire hanger, or a plastic hanger as illustrated in FIGS. 4 and 6.

U.S. Pat. No. 4,137,661 discloses an "identification procedure for suspended articles of clothing and carrier for application of the procedure." In this patent, the marking of data with respect to size, quality, color, manufacturing data, delivery, pattern or price is affixed to a label member 5 and removably secured to the hanger.

U.S. Pat. No. 3,024,953 discloses a rectangular plastic guard which is adapted to be secured to the wire hook of a clothes hanger, and which extends upwardly therefrom to assist in preventing the clothes hangers from becoming entangled with one another.

U.S. Pat. No. 1,099,261 discloses a clothes hanger particularly adapted for hanging sets of furs, with a metal rectangular plate 10 which receives an index card describing the furs suspended therefrom.

U.S. Pat. No. 4,115,940 discloses a garment hanger with a size indicator in which the indicia or carry tab is visible when the garment is hung on the hanger.

U.S. Pat. No. De. 302,214 discloses a garment hanger in three embodiments, two of which disclose indexing indicia. U.S. Pat. No. De. 302,214 is also assigned to the assignee of the present invention.

U.S. Pat. No. De. 244,197 discloses an ornamental design for size indicator for a garment hanger that is intended for attachment to a garment hanger. Each of these devices is manually affixed, and further, may include additional steps of printing, writing, or otherwise creating the desired indicia to be attached to the hanger.

SUMMARY OF THE INVENTION

The present invention is an automatic system for sizing hangers with an indicating means that is directly related to some attribute of the garment suspended from the hanger. The indicating means is automatically attached to the hanger at the time the garment is hung or suspended from the hanger. The invention further includes a method, means and system for manufacturing the indicating means, and then distributing them to a plurality of locations around the world for attachment to the garment hangers at the time the garments are suspended therefrom.

The present invention provides a colorful, easy to read, visual display of one or more attributes of the garment which could be easily discerned by the customer when a plurality of like garments are suspended from a display rack. The sizing indicator is attached above the hook of the hanger to be easily visible above the hangers, even when a plurality of like garments are suspended adjacent one another on a longitudinal rail. By imprinting the size in an Arabic numeral, i.e., 44, and a garment attribute in a color, it is possible for the customer to select the desired garment quickly and easily. When plural garments are involved, such as a bra and panty set, the bra size can be imprinted on one side of the indexing means, while the panty size can be printed on the opposing side of the indexing means.

The present invention also includes a system for producing a plurality of hangers, each of which has an index coded cap which is related to a specific characteristic of the garment hung from the hanger wherein the individual hangers are produced at a plurality of locations, and the index coded caps are produced at a central location. This system is particularly adapted to the manner in which garments are currently manufactured, distributed and sold in the United States. Large national retailers of clothing generally contract with a plurality of clothing manufacturers to produce uniform standardized clothing which is essentially identical from batch to batch, even though manufactured by different entities. These plurality of manufacturers in turn produce the clothing at their own plants, or in many cases sub-contract the production of the garments to far eastern manufacturers based in Hong Kong, Taiwan, Singapore and South Korea.

It is desirable to maintain a consistent appearance for the indexing features of the hanger. It is also desirable to locally produce the hanger at the remote manufacturing location to avoid the shipping costs associated with the bulk shipment of millions of hangers from the United States to far eastern locations. Therefore, the present invention is particularly suited to the production of uniform indexing caps in the United States, and the shipment of those caps to a plurality of garment manufacturing locations, wherein the caps may be automatically attached to the garment hangers, at the time the garment hanger is dispensed for securing the clothing thereto. The use of such a hanger facilitates the "rack ready" production of clothing articles wherein the clothing articles are manufactured and suspended from hangers in the far east, together with the retail store's price tag, and mounted in intermodal containers for shipment to the United States whereupon the "rack ready" clothing may be transferred from the intermodal container to the display rack in the retail store without any additional labor input.

To facilitate this system, the present invention also includes a means for aligning and stacking the index coded caps in a predetermined relationship to one another, so that the caps may be loaded in a machine for automatically affixing the index coded caps to the garment hanger. The present invention also includes means for transporting the stacked cap and a bundle which maintains said predetermined relationship to the plurality of locations for which the stacked caps are to be attached to the hangers. Finally, the present invention includes automatic means for sequentially affixing the index coded caps to the garment hangers at each of the plurality of locations wherein the index coded caps are secured to the hanger automatically at the time the garment is hung from the hanger.

The present invention also includes a mechanized means for manufacturing a bundle of stacked indexing caps for subsequent attachment to a plurality of hangers wherein the individual index coded caps are injection molded in a plurality of colored batches. The mechanized means further includes a centrifugal means for aligning the caps from each batch in a predetermined stacked relationship to one another, and a means for binding the caps into a bundle for transport to a plurality of remote locations.

The present invention also includes a garment hanger having an indexing cap for identifying at least one characteristic of the garment hanging therefrom wherein the garment hanger includes a hook adapted to engage a rod or other supporting means, and an upstanding flange extending from the hook for receiving one of a plurality of different indexing caps, said flange extending and projecting above the top contour of the hook. The hanger of the present invention also includes a snap fit engagement means defined by the upstanding flange, and a generally planar and stackable indexing cap having a recess formed therein for receiving the flange of the hanger therewithin. The indexing cap also defines a through opening which facilitates stacking the indexing cap in a bundle of stacked caps during transport, and which receives the snap fit engagement means when the indexing cap is attached to the hanger.

The present invention also includes an automatic means for assembly of the indexing coded cap and the hanger at the time the clothing is hung from the hanger. This means includes a magazine for receiving a bundle of stacked caps, a separate magazine for receiving a plurality of stacked hangers, and a reciprocal means for simultaneously dispensing one of the index caps from the magazine and securing said cap to the hanger at the time the hanger is presented to the operator for attaching the clothing thereto.

DETAILED DESCRIPTION OF THE PREFERRED EMBODIMENTS

FIG. 1 is a plan view of one side of a bra and panty garment hanger having an index coded cap relating to an attribute of a bra to be suspended therefrom.

FIG. 2 is an exploded view of the opposite side of the bra and panty hanger illustrated in FIG. 1 with the index coded cap separated from the hanger and displaying an attribute of a panty to be suspended therefrom.

FIG. 3 illustrates a cross-section of the index coded cap taken along section line 3—3' of FIG. 2.

FIG. 4 represents a corresponding cross section of the hanger taken along section line 3—3' of FIG. 2.

FIG. 5 illustrates an end-view of the indexing cap illustrated in FIG. 1.

FIG. 6 illustrates a top view of the indexing cap and hook illustrated in FIG. 1.

Figure 9:
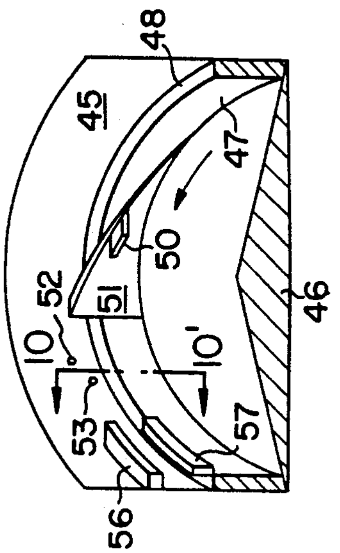
FIG. 9 is a diagrammatic view taking along cord section 9—9' of FIG. 8.
Figures 10A, 10B:
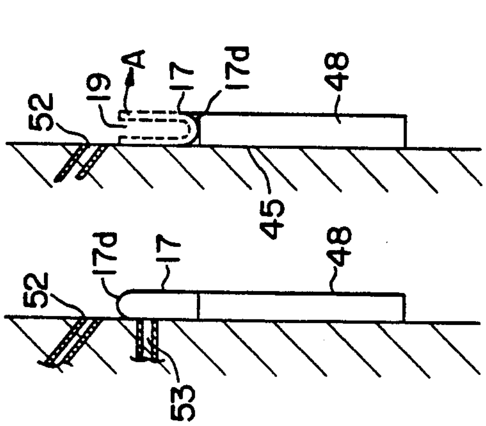

FIG. 10*a* is a diagrammatic view of an air jet separator means taken along section line 10—10' in FIG. 9.

FIG. 10*b* is a diagrammatic illustration of an air jet separator means also taken along section line 10—10' in FIG. 9.

Figure 11:
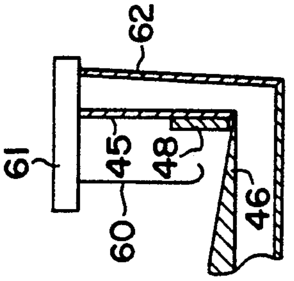
Figure 8:
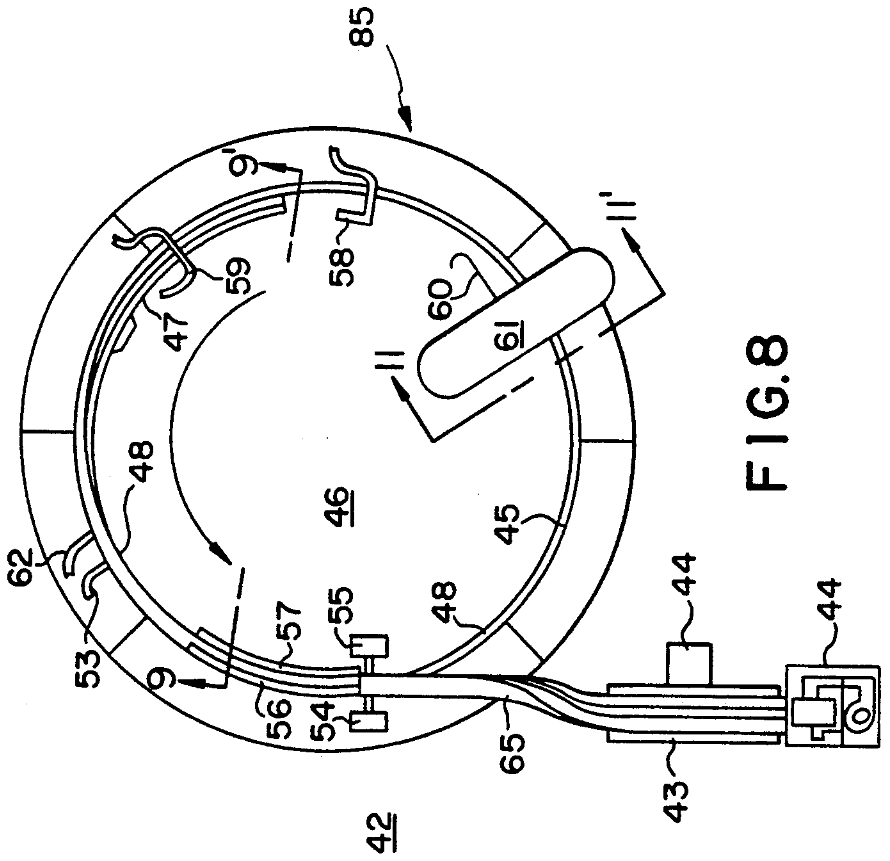
FIG. 8 is a top view of a means for aligning and stacking said index and coded caps.

FIG. 11 is a cross-sectional view taken along section line 11—11' of FIG. 8.

Figure 12:
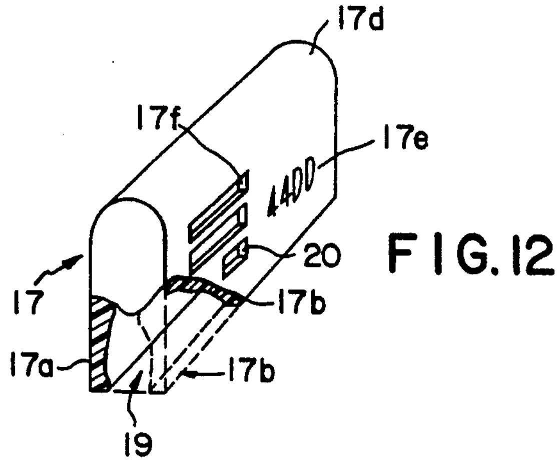

FIG. 12 is a partially cross-sectioned isometric view of an index coded cap manufactured in accordance with the present invention.

Figure 13:
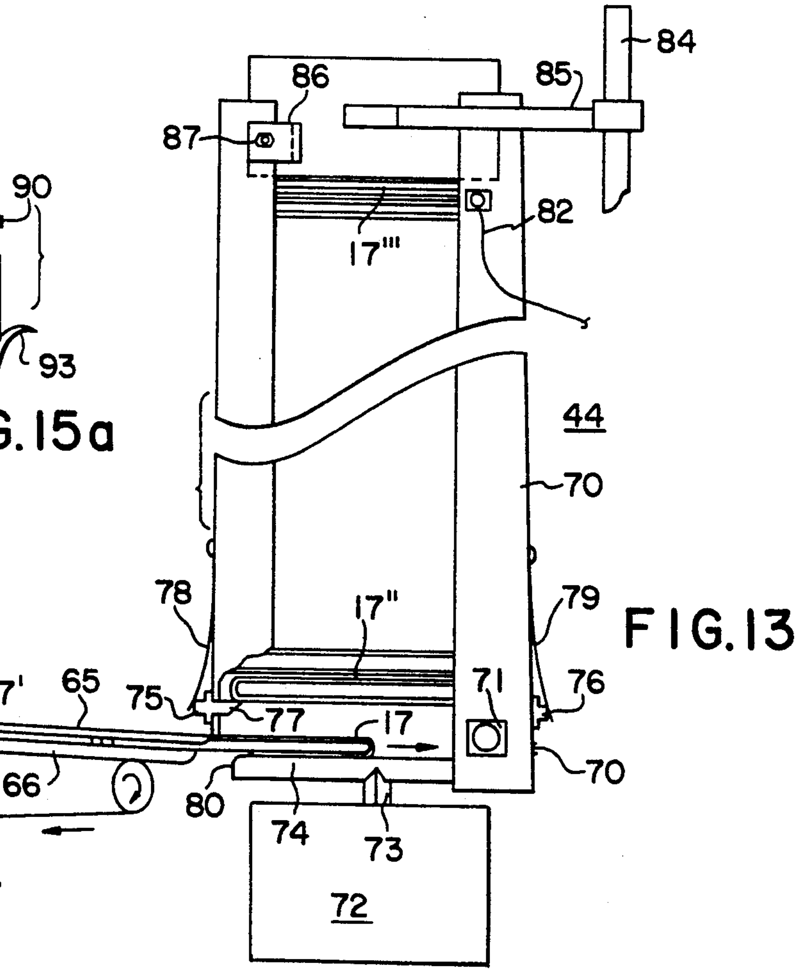

FIG. 13 is a partially cross-section planar view of the stacking means of the present invention.

Figure 14:
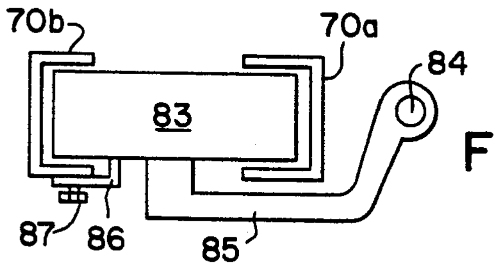

FIG. 14 is a top plan view of the magazine of the present invention.

Figure 15:
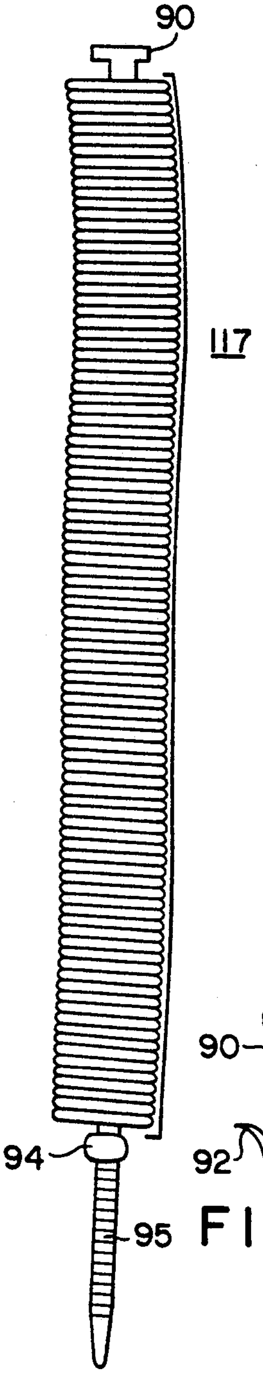

FIG. 15 is a plan view of a bundle of stacked index coded caps prepared in accordance with the present invention.

Figure 15A:
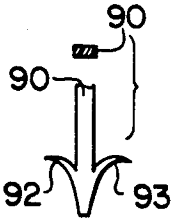

FIG. 15*a* is an alternate embodiment of a portion of the invention illustrated in FIG. 15.

FIG. 16 is an isometric plan view illustrating the means for assembling the index and coded caps and hangers at the time the hangers are dispensed.

FIG. 17 is a top plan view of the means for assembling illustrated in FIG. 16, illustrating a second operating position in dotted lines.

FIG. 18 is an isometric plan view of a manual means for assembling index coded caps and hangers.

FIG. 19 is a top plan view of a portion of the invention illustrated in FIG. 18.

FIG. 20 is a side plan view of the element illustrated in FIG. 19.

DETAILED DESCRIPTION OF THE PREFERRED EMBODIMENTS

FIGS. 1–6 illustrate a garment hanger and the index coded cap of the present invention. While the invention will be described and illustrated with respect to a single bra and panty hanger, it is understood that the invention is equally applicable to other types of garment hangers. As illustrated in FIGS. 1 and 2, the garment hanger is a bra and panty hanger having bra hanger strap clips 12*a*,12*b* and panty hanger clips 13*a*, 13*b* arranged at either end of central support 14. The hanger presents a first side in FIG. 1, and the opposite side in FIG. 2, with the index cap positioned for attachment in FIG. 2.

Hanger 11 also includes a hook member 15 having an upstanding flange 16 (illustrated in FIG. 2) for receiving one of a plurality of different indexing caps, one of which is illustrated at 17 in FIGS. 1-6. The flange 16 projects above the top contour of hook 15. A snap fit engagement means 18 is defined on the upstanding flange 16 as illustrated in FIG. 2. The index coded cap 17 is generally planar and stackable and has a recess 19 formed therein (illustrated in FIG. 3) for receiving the upstanding flange 16 therewithin. The indexing cap 17 defines a through opening 20 (illustrated in FIGS. 1-3 and 12) which receives the snap fit engagement means 18 when the index cap is fitted to the upstanding flange. This through opening is also used to form a bundle of stacked caps as will be hereinafter later described with respect to FIGS. 13-15. The hook member further defines a horizontal flange 21 which cooperates with the snap fit engagement means 18, and a first 16*a* and second 16*b* edge of flange to engage the recess 19 defined within the index cap in a wedging manner. Edges 16*a* and 16*b* extend upwardly and inwardly in an angular fashion to assist in centering the cap for engagement of the snap fit engagement means 18. Hook member 15 also includes an inner flange 22 which extends from the tip 15*a* of the hook to the intermediate frame member 14 to strengthen the hook and to provide a larger load bearing surface when the hanger engages a rod or other supporting means during use. Hook member 15 also includes a second reinforcing rib 23 which extends upwardly from control support member 14 to strengthen the hook and to resist twisting or flexure of the hook 15 when the garment hanger is in use. Flanges 22, 23 join with similarly defined upper flange 24, defined by central support member 14. Central support member 14 includes upper and lower flanges 24, 25 and a center medial flange 26 which serves to stiffen the hanger.

By choosing a relatively resilient plastic material for the hanger 11, and a relatively stiff plastic material for the cap, the snap fit engagement can be made relatively permanent, since once the index coded cap is secured by snap fit engagement barbs 18, it is necessary to bend or flex the side walls 17*a*, 17*b* beyond barbs 18 before the cap can be removed. The stiffness of the plastic material used to form the cap thereby determines the degree of difficulty one encounters in removing the cap. Further, the fit and cooperation of the flat edge 17*c* of the cap and the horizontal flange 21 makes it difficult to insert a screw driver, or other means, with which to pry the side walls apart for removal of the cap.

As illustrated in FIGS. 1-6, the index cap includes several indexing features. The cap is color coded to denote a specific attribute of the garment suspended from the hanger. In addition, the indexing cap 17 carries on one side the legend 44DD as illustrated at 26 to denote a bra size suspended from the hanger. On the opposite side of the cap, as illustrated at 27 in FIG. 2, a panty size "6" is indicated for a hypothetical bra and panty set. In this instance, the color coding could relate to a certain grade and quality of garment, a certain style of garment, or to visually reinforce one of the printed indicia such as cup size or panty size. This color attribute would assist the purchaser in selecting the appropriate garment for his or her intended use.

The index cap 17 is planar, having a first and second planar side 17*a*, 17*b* which facilitate stacking of the caps for shipment as a bundle of stacked caps. The bottom portion of the cap 17*c* defines a flat edge, while the top edge of the garment 17*d* is rounded. The flat configuration 17*c* and rounded configuration 17*d* assist the sorting and stacking mechanism in automatically aligning and stacking the caps in a predetermined manner as will be hereinafter illustrated and described with respect to FIGS. 8-11.

As illustrated in FIG. 6, the top of the indexing cap 17*d* is unadorned in the preferred embodiment and is somewhat wider than the internal flange 15*a* and 15*b*. It should be noted that as illustrated in FIG. 6, flanges 22 and 23 are not visible, and that horizontal flange 21 is substantially the same length as the indexing cap 17, and therefore not visible in FIG. 6.

The garment hanger illustrated in FIGS. 1 and 2 also includes a center strengthening rib 26. The use of ribs 22-26 allow the central web of the hanger to be reduced in thickness and weight, thereby reducing the material cost for the hanger and the shipping cost during transit from the various remote manufacturing facilities to the United States. In the preferred embodiment, the hanger is formed of Styrene which provides a clear, virtually transparent hanger for maximum display of bras and panties suspended therefrom. Alternately, the hanger could be formed from K Resin, H.I. Styrene and Polypropylene or other suitable thermoplastics.

Figure 7:
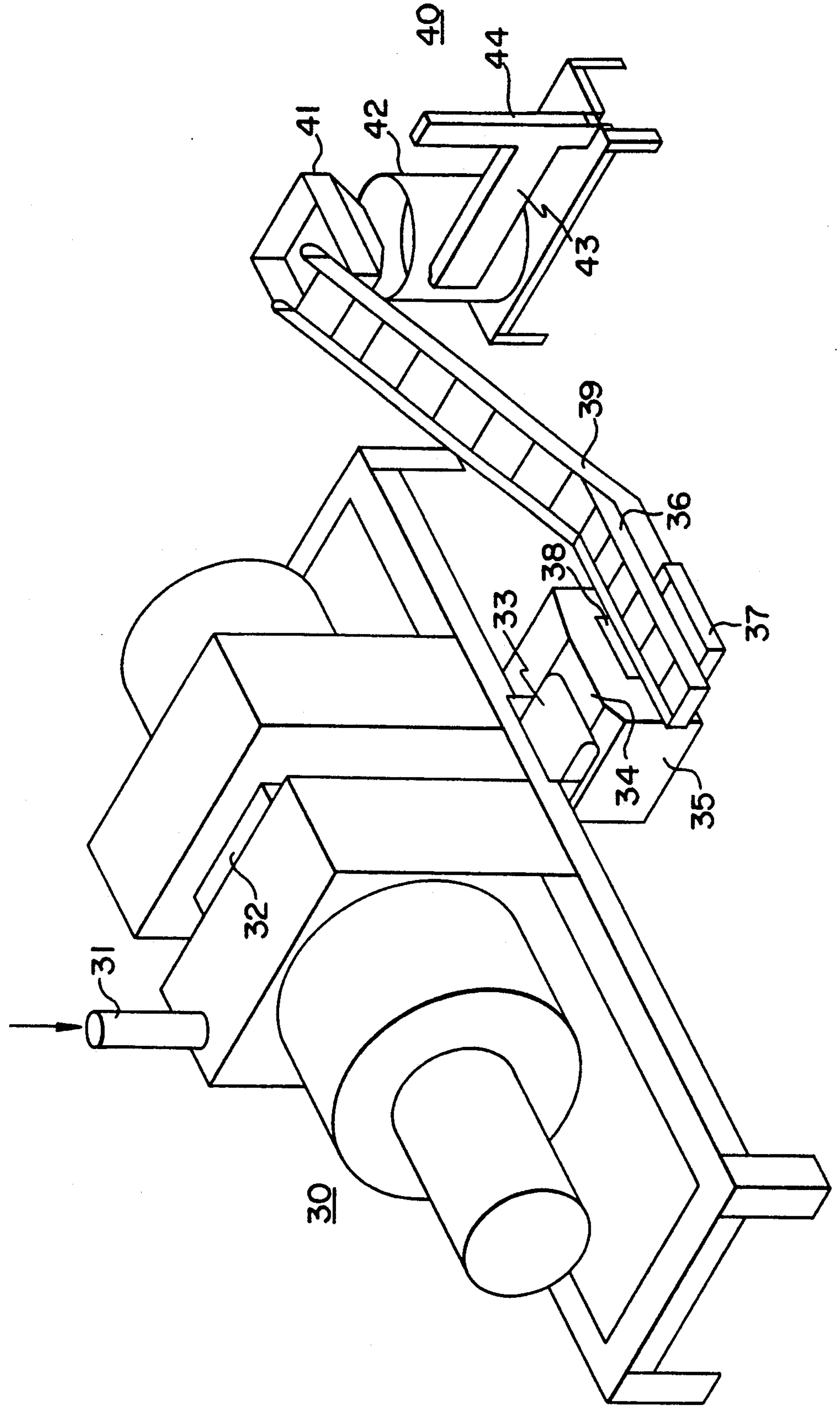
FIG. 7 is an isometric view of a mechanized means for producing a bundle of stacked index caps in accordance with the present invention.

FIG. 7 is an isometric view of a mechanized means for manufacturing a bundle of stacked indexing caps (illustrated in FIG. 15). The means includes an injection molding machine 30 having a supply of pelletized thermoplastic through an air conveyor system 31 and a pair of opposing mold cavities, generally indicated at 32. In one embodiment of the invention, the injection molding machine is manufactured by various suppliers around the world. In operation, the mold cavities 32 are first filled with thermoplastic at elevated temperatures and pressure to form multiple index coded caps in a single cycle. The number of index coded caps formed during each cycle is a function of the capacity of the injection molding machine and the mold configuration. As the injection mold 32 is separated, the index coded caps, and molding sprues fall from the cavities onto conveyor belt 33 which travels beneath the injection molding machine. The index coded caps and molding sprues are then discharged into an open hopper 34 of a sprue separator 35 which discharges the index caps through an upper opening onto intermediate conveyor 36 and the molding sprues into a waste collection box 37. The accumulated sprues may then be shredded and re-introduced into the product stream at 31 as desired.

The sprue separator 35 is a device, manufactured by Alliance Equipment Co. of Sterling, Mass. and uses counter rotating brushes to direct the index coded caps through the upper opening 38 onto conveyor 36. The caps deposited on conveyor 36 are then transferred to a second conveyor 39 for transport to an aligning and stacking machine generally indicated at 40. While belt conveyors are illustrated in FIG. 7, it should be understood that air conveyors or other suitable means for transport of the index coded caps could be used to move the caps from the injection molding location to the aligning and stacking station. The aligning and stacking machine includes a central hopper 41 equipped with a shut-off valve and vibrating magnet to assist in controlling the flow of caps from the injection molding machine 30, to the aligning and stacking machine 40. As the index coded caps are discharged from hopper 41, they are deposited into a circular chamber generally indicated in FIG. 7 at 42 which aligns the caps in a serial fashion as will be hereinafter further illustrated and described with respect to FIGS. 8–11. The index coded caps are randomly oriented during all stages of the transport from the injection molding machine 30 to the circular chamber 42. The aligning means provides a serial stream of index caps which exit the circular chamber 42 along conveyor 43 in sequential serial alignment with all caps aligned in the same direction and orientation. The output of conveyor 43 feeds a stacking mechanism 44 which creates a bundle of stacked caps from the serial sequential stream arriving from conveyor 43, as will be further illustrated and described with respect to FIGS. 13–15. When 100 caps or any other desired number, have been stacked in a stacking mechanism 44, a plastic ribbon is inserted through the opening 20 defined in the index coded caps to create a bundle of stacked caps, which are then lifted from the magazine for transport to a plurality of garment assembly locations. The use of a central location for injection molding machine 30, assures that the respective batches of index coded caps are all of the same color and appearance. The different colors of plastic may be maintained in separate silos (not shown) in FIG. 7) and directed to the injection molding machine 30 through an air conveyor system as illustrated at 31. When a first batch of caps is completed, the mold cavities 32 are changed to prepare molds with the new indicia, and the air conveyor system will draw a different colored plastic from a separate silo. The rest of the mechanized system remains essentially unchanged, thereby providing quick, convenient and rapid ability to produce a plurality of different batches of stacked index coded caps.

As illustrated in FIG. 8, the aligning and stacking mechanism 40 includes a circular chamber 42 having a stationary inner circular wall 45 and a rotating circular bowl 46. As the stacked caps are dropped into the circular chamber by hopper 41, they are rotated in a counterclockwise direction by the rotating bowl 46, and the centrifugal force generated by the rotating bowl. The inverted and downwardly beveled slope of the bowl, illustrated in FIG. 9, forces the jumble of stacked caps outwardly against stationary outer wall 45. A ramp 47 extends from the rotating bowl 46 upwardly to an annular band 48 which extends around the inner lower portion of side wall 45. As the jumble of stacked caps encounters ramp 47, the centrifugal force drives selected caps upwardly along the ramp, with a preference for those that are aligned along the circumferential path defined by the annular band. The aligned caps are driven upwardly along ramp 47 by other caps from the rear and are held against the annular band 48 by the centrifugal force exerted by more inwardly directed caps in the jumbled pile of caps. A transition plate 50 is positioned parallel to the upper edge of annular band 48 to assist the caps in making the radial transition from the radius defined by ramp 47 to the radius defined by annular band 48. A separator plate 51 is adjacent to ramp 47 and begins with the entry point of ramp 57, but continues upwardly past the elevation of the upper shelf defined by annular band 48, and extends inwardly to contact annular band 48 as ramp 47 tapers off underneath. The separator plate 51 is much thinner than ramp 47, while ramp 47 and annular band 48 are both the approximate width of one of these stacked caps. As the stacked caps emerge from the separator plate 51 along the top of annular band 48, they encounter first and second air jets 52, 53. The motive force for the caps is a push from the rear generated by the jumble of stacked caps advancing upwardly along ramp 47. As illustrated in FIG. 10*b*, air jet 52 is directed downwardly across the upper outer periphery of the advancing row of index coded caps 17. The curved lower portion 17*d* creates instability on the part of the cap if the cap is oriented upside-down. Air jet 52 strikes the inner recess 19 and drives the stacked cap off the wall in the direction of arrow A. On the other hand, a properly aligned cap will advance under the air jet as illustrated in FIG. 10*a*, and the rounded top portion 17*b* thereby reduces the impact area from jet 52. A second air jet 53 is provided to displace all caps from the annular band 48 in the event the conveyor mechanism 43 and stacker mechanism 44 are full. The air jet 53 is activated when light from photo diode 54 is no longer received by photo resistor 55 as indicated in FIG. 8 because the column of stacked caps has completely filled the conveyor 43 and stacking mechanism 44. As the row of aligned caps passes air jet 53, it encounters guides 56, 57 which maintain the caps in an aligned relationship as they are fed in the conveyor means 43. In addition to the centrifugal force generated by rotating bowl 46, additional air jets may be provided as indicated at 58 and 59 to create an inner vortex of air which swirls around the inner wall 45 of the chamber. A second air jet 59 is directed somewhat inwardly to assist the caps in the transition from ramp 47 to annular band 48. While it would be possible to combine ramp 47 and ramp 48 in a single unitary structure, it has been found less expensive to use a singular annular band 48, and a short ramp 47 which is fitted therewith.

The remaining jumble of stacked caps is swept in a circular manner against annular band 48 by rotating bowl 46, and the centrifugal force generated by the circular movement of the caps. When the jumble of caps has accumulated to a predetermined height, the humble strikes a feeler probe 60 illustrated in FIG. 11. The feeler probe 60 is suspended from gantry 61 which spans both the inner wall 45 and outer wall 62 of the circular chamber 42. When deflected by the jumble of stacked caps, a micro switch (not shown) attached to feeler probe 60 actuates a shut-off valve in hopper 41 to stop the flow of index caps until the jumble is reduced to the predetermined level. As the feeler probe 60 returns to its normal position, the outlet valve on hopper 41 is opened, and an electromagnet is energized which vibrates the hopper 41 to assist in releasing supply of caps into the circular chamber 42.

The alignment mechanism also includes a twisted guide 65 which receives the row of stacked caps in a vertical alignment as defined by guides 56, 57 and annular band 48 (illustrated in FIG. 9) and rotates them 90° to a flat horizontal position as illustrated in FIG. 8. The lower portion of guide 65 is cut away to receive a conveyor belt 43 which is powered by motor 44 to assist in driving the caps to the stacking mechanism 44. The driving force which transports the caps through the twisted portion of guide 65 is generated by the jumble of stacked caps circulating on rotating bowl 46 and is transmitted end to end through each of the caps aligned in serial fashion along the top shelf of annular band 48.

As illustrated in FIG. 13, the conveyor means 43 includes an endless belt 66 which is tensioned by idler roller 67 and driven by motor means 44 (illustrated in FIG. 8). As illustrated in FIG. 13, two caps, 17 and 17′ are shown exiting guide means 65. The first cap 17 is driven inwardly by the conveyor means unitl is strikes the outer wall of magazine 70. A fiberoptic photodiode-photoresistor mechanism indicated at 71 senses the arrival of the new cap 17, a control means (not shown) actuates pneumatic motor 72 which drives plunger 73 and platform 74 upwardly, thereby elevating the cap 17 to the position illustrated by cap 17″ in FIG. 13. As the cap is elevated upwardly, a pair of beveled dogs 75 and 76 are displaced outwardly by means of their beveled edge, (one of which is illustrated at 77 in FIG. 13), until the cap has passed beyond the upper face of the dogs. As soon as cap 17 is in position, spring means 78, 79 urge the dogs 75 and 76 inwardly, thereby suspending cap 17 in the new position illustrated by cap 17′ in FIG. 13. While the plunger 73 is in an extended position, a skirt 80 prevents the entry of any additional cap, such as cap 17′, until the plunger has retracted to the position illustrated in FIG. 13. The operation of pneumatic motor 72 is controlled by a timer, actuated by fiberoptics 71 connected to a photoresistor-photodiode arrangement, and by fiberoptic arrangement 82 which is arranged at the top of the stacking arrangement to generate an interrupt signal for the control means when the magazine 70 is fully loaded.

Magazine 70 is defined by a pair of complementary U-shaped channels 70*a*, 70*b* as illustrated in FIG. 14. A weighting mechanism 83 is dimensioned to travel within the guides 70*a*, 70*b* and exert a downward force on the stacked caps as the stacking mechanism 72 is operating. The weighting means 83 is connected to a vertical rod 84 by means of offset arm 85 which maintains the weight 83 in alignment, and provides for the easy removal of the weight when the magazine 70 is filled. In addition, a friction guide 86 is mounted on weight 83, and contains a thumbscrew 87 which can exert a vertical drag on weight 83, which drag acts to offset the force of pneumatic cylinder 72. It has been found in practice, that the force and speed of pneumatic cylinder 72, when coupled with the lightweight of the index cap 17, will cause the index caps to flip in magazine 70, unless restrained by a weight such as that indicated at 83.

When the magazine is filled, the stacked caps, one of which is illustrated at 17‴ will interrupt a light beam emitted by a photodiode in fiberoptic array 82, and will generate an interrupt signal for the control means which controls pneumatic cylinder 72. At that time, the operator can remove the weight 83 and swing it around its axis on guide 84, and insert a plastic strand 90 through the aligned through holes 20 defined by the stack of aligned caps. The plastic strand 90 is rectangular in cross-section as illustrated in FIG. 15*a*, and matches the rectangular configuration of through hole 20 defined in each of the stacked caps, to thereby maintain the caps in their initial alignment during transport. The plastic strand 90 may include one-way barbs 92, 93 as illustrated in FIG. 15*a*, or a round plastic ball 94 as illustrated in FIG. 15. Ball means 94 defines a circular inner opening which receives the rectangular cross-section of strand 90 in a binding engagement. The binding engagement may be further enhanced by serrations 95 formed on the outer surface of the lower portion of plastic strand 90.

As illustrated in FIG. 12, the index caps 17 include first 17*a* and second 17*b* generally planar side walls which facilitate their stacking as a bundle of stacked caps as illustrated in FIG. 15. The through hole 20 defined in both side wall 17*a*, 17*b*, is configured to match the rectangular configuration of the plastic strand 90 illustrated in 15*a*. The index cap may include a variety of indicia such as "44DD" illustrated at 17*e* and various design ornamentation as indicated at 17*f*. As can be seen from FIG. 12 and FIG. 3, the inner cavity 19 is tapered to snugly engage the upstanding flange 16 defined by the hook 15 of hanger 11.

With respect to the rate of supply of the index coded caps to the stacking mechanism illustrated in FIG. 13, it should be noted that the bowl speed of rotating floor 46, the vibration of hopper means 41, the speed of conveyor means 43, and the repetition rate of pneumatic motor 72 are all independently controllable to ensure maximum throughput of the device.

FIGS. 16 and 17 illustrate an automatic means for assembly of hangers and indexing caps at the time the clothing is hung from the hangers. The device is a modified Hangermatic 589 manufactured by Trim-Master, 4860 North 5th Street Highway, Temple, Pa. 19560.

The original Hangermatic machine includes a pair of magazine towers 101 and 102 which are dimensioned to contain a vertical stack of hangers therebetween. The hangers rest on a platen member 104 and are selectively engaged by a reciprocating plate 105 which selectively engages the lower most hanger and urges it outwardly to stop means 106 when actuated. As it reaches the stop means, it displaces the outer platen 107 as illustrated in FIG. 17, which opens a pneumatic bleed port mounted in the face of platen 104. As long as the outer platen 107 is in its extended position, the pneumatic motor means remains stationary. When the operator has fitted a garment to the extended hanger and removes the hanger, the outer platen 107, which is spring loaded, returns to the inner platen 104, thereby sealing the pneumatic bleed port, and activating a control means (not shown) for pneumatic motor 103 to return reciprocating plate 105 to its original position. When set to fully automatic operation, the pneumatic motor 103 will immediately begin a return stroke for plate 105 which will pick up another hanger from magazines 101, 102, and advance it outwardly against eccentric stops 106.

In the present invention, a third magazine 108 has been added which receives the bundle of stacked caps illustrated in FIG. 15, and the configuration of reciprocating plate 105 has been altered to provide a cut-out 105*a* which conforms to the exterior dimension of the index coded cap 17. Immediately adjacent cut-out 105*a*, are alignment cams 109. The ends of 111*a*, 111*b* of reciprocating plate 105 have also been altered to provide a spring loaded tip for engagement of the hanger 11. In addition, the magazines 101 and 102 are now independently adjustable by means of bracket 110 and support 112 to configure the Hangermatic machine to a wide variety of hanger configurations. Each of the magazines 101, 102 and 108 have cut-outs 101*a*, 102*a* which allow the hangers and index caps to be withdrawn from the magazines as plate means 105 reciprocates forwardly as illustrated in FIG. 16. Stand-off legs 113–115 are used to elevate the Hangermatic above the employee work bench, to assist the operator in draping the article of clothing about the hanger before the hanger is withdrawn from the Hangermatic machine. Alternately, the individual legs can be altered in length to provide a slanted configuration which will facilitate hanging clothes therefrom.

As illustrated in FIG. 17, the Hangermatic machine is loaded with a bundle of stacked caps indicated at 118 which are loaded into magazine 108. Magazine 108 is suspended above the reciprocating plate 105 and platen 104 by brackets 116, 117. Prior to engagement with the hanger 11 the spring loaded tips 111*a*, 111*b* of reciprocating plate 105 are fully distended. As plate 105 moves forward, or downwardly as illustrated in FIG. 17, it first engages an index cap from the stack of caps 118 within recess 105*a*. The alignment surface 109 centers the hook 15 within reciprocating plate 105 so that the index cap is properly aligned with the upstanding flange 16 during attachment. As indicated earlier, the upwardly and inwardly directed edges 16*a*, 16*b* of flange 16 also assist in centering the index cap as it is attached to hook 15. Plate 105 is dimensioned such that the index cap is seated on hook 15 by the impact of plate 105 as the floating spring loaded tips 111*a*, 111*b* engage the center portion of hanger 11. The hanger is then driven forwardly, or downwardly as illustrated in FIG. 17 out of the magazines 101, 102 to the position illustrated by the dotted lines in FIG. 17. As illustrated in FIG. 17, the hanger engages pivoted eccentric stops 106*a*, 106*b* and displaces the end portion of platen 104 outwardly as illustrated in FIG. 17. The spring loaded tips 111*a* and 111*b* compensate for irregularities in hanger molding, and reduce the impact of the reciprocating plate 105 on the central portion 14 of the hanger. This substantially eliminates the broken and shattered hangers normally encountered in this type of device. As the pneumatic cylinder 103 drives platen 104, the spring loaded tips 111*a*, 111*b* are compressed, and the spring loaded platen 107 is extended, thereby opening the pneumatic bleed line positioned between platen 104, and platen 107. As illustrated in FIG. 17, the hanger is now presented to the operator with the clips 12*a*–12*c* suspended above the work space, and free from any immediately adjacent encumbrances, so that the operator may quickly and easily attach a bra strap thereto. As the article of clothing is attached to the hanger, it is lifted free of the spring loaded tips 111*a*, 111*b* of plate 105, which allows platen 107 to close, thereby actuating the control mechanism for the Hangermatic machine, to return reciprocating plate 105 back to its original starting position as illustrated in FIG. 17. If set on automatic, as soon as the plate 105 has reciprocated to its fully retracted position, it is reciprocated forward to automatically dispense another index coded cap and hanger.

FIG. 18 illustrates a manual means for affixing the index caps to hanger 11. As illustrated in FIG. 18, a stationary platen 125 is fitted with guide means 126, 127 which are secured to platen 125 by screws and elongated slots 128 which enable the means to be adjusted for a variety of hanger hook sizes. A backet means 129 suspends an index cap magazine 130 above platen 125, the approximate distance of the width of one index coded cap. Immediately under magazine 130 is an opening 131 which is aligned with the through hole 20 defined in the index cap. Immediately below the opening 131 is a reciprocating fork 132 which has both horizontal and vertical fork tines as illustrated in FIGS. 19 and 20.

In operation, a bundle of stacked caps, such as that illustrated in FIG. 15, is dropped into the magazine 130, such that the serrated end 95 and ball closure means 94 extend through opening 131. Reciprocating fork 132 is then driven inwardly in the direction illustrated by arrow B in FIG. 18 to engage ball means 94 as illustrated in FIGS. 19 and 20. As illustrated in FIG. 19, the strap 90 is frictionally engaged within ball 94. As soon as the ball is engaged by the fork means 132, the strap 90 is withdrawn from the top of the magazine, and the operator is then free to insert a hanger such that the hook of the hanger engages the lowermost index coded cap in the magazine 130. In operation, the operator lies the hanger flat on platen 125, and reciprocates it inwardly in the direction of arrow A until the hanger hook has firmly seated within the index coded cap. The hanger and cap are then withdrawn from the stack, and another index coded cap is present for attachment. Legs 133–135 are provided to position platen 125 at a comfortable working height for the operator.

As will be understood from the foregoing, the present invention includes a system for producing a plurality of hangers having index coded caps which are automatically affixed to the hanger at a plurality of remote locations. The index coded caps may be mass produced in a mechanized means and method of injection molding, aligning, stacking and binding of the caps into a stack bundle for shipment. When the bundle of stacked caps has arrived at its end destination, it is inserted into a magazine 108 or 130 and the caps are subsequently attached to a locally produced hanger. It is apparent therefore from the proceeding description that the objects of the invention are efficiently attained and that changes may be made in the details of the above construction without departing from the spirit and scope of the present invention, which is set forth in the following claims.

We claim:

1. A system for producing a plurality of hangers at a plurality of locations wherein each hanger has an index-coded cap, said system comprising:
   - a plurality of index-coded caps, wherein each index-coded cap has at least one indexing indicia related to a specific characteristic of a respective garment to be hung from a respective hanger;
   - means for aligning and stacking said plurality of index-coded caps in a predetermined relationship to produce a stack of index-coded caps;
   - means for transporting said stack of index-coded caps to a location included in said plurality of locations where each index-coded cap is to be affixed to a respective hanger; and
   - means for sequentially affixing each index-coded cap to a respective hanger at said location, each index-coded cap being secured to its respective hanger at the time said garment is hung therefrom.

2. The system as claimed in claim 1 wherein said at least one indexing indicia is the color of each index-coded cap.

3. The system as claimed in claim 1 wherein every hanger is produced at a single location.

4. The system as claimed in claim 1 wherein each index-coded cap is manufactured at a central location to achieve uniformity of color and subsequently each index-coded cap is shipped to a second location where each index-coded cap is to be affixed to a respective hanger.

5. The system as claimed in claim 1 wherein said means for aligning is a centrifugal chamber.

6. The system as claimed in claim 1 wherein said stack of index-coded caps is bundled and transported.

7. The system as claimed in claim 1 wherein each index-coded cap defines a through hole, and said means for transporting said stack of index-coded caps further includes a ribbon which extends through said through hole of each index-coded cap to secure said stack of index-coded caps as a bundle.

8. The system as claimed in claim 7 wherein said ribbon has an angular cross-section which cooperates with said through holes to maintain said predetermined relationship.

9. The system as claimed in claim 1 wherein the means for affixing each index-coded cap to its respective hanger is an automatic dispenser which affixes an index-coded cap to a hanger as said automatic dispenser dispenses said hanger.

10. The system as claimed in claim 9 wherein said means for affixing each index-coded cap further includes a magazine of stacked hangers and a reciprocating member adapted to engage an index-coded cap from said stack of index-coded caps and to forcibly slide said index-coded cap onto a hanger as said hanger is expelled from said magazine of stacked hangers.

11. The system as claimed in claim 10 wherein each index-coded cap is stacked in a cap magazine and secured to a respective hanger when said hanger is inserted into a recessed cavity at the bottom of said cap magazine.

12. The system as claimed in claim 1 wherein said means for sequentially affixing each index-coded cap is manually actuated.

13. A system for producing a plurality of hangers wherein each hanger has an index-coded cap, said system comprising:

a plurality of index-coded caps, wherein each index-coded cap has at least one indexing indicia related to a specific characteristic of a respective garment to be hung from a respective hanger;

means for aligning and stacking said plurality of index-coded caps in a predetermined relationship to produce a stack of index-coded caps;

means for transporting said stack of index-coded caps to a location where each index-coded cap is to be affixed to a respective hanger; and means for sequentially affixing each index-coded cap to a respective hanger at said location, each index-coded cap being secured to its respective hanger at the time said garment is hung therefrom.

* * * * *

UNITED STATES PATENT AND TRADEMARK OFFICE

CERTIFICATE OF CORRECTION

PATENT NO. : 5,285,566

DATED : February 15, 1994

INVENTOR(S) : David Marshall, et al.

It is certified that error appears in the above-indentified patent and that said Letters Patent is hereby corrected as shown below:

Column 1, line 7: "division" should read --divisional--

Column 5, line 21: after "flange" insert --16--

Column 7, line 50: after "band" insert --48--

Column 8, line 38: "humble" should read --jumble--

Column 9, line 13: "17'" should read --17"--

Signed and Sealed this

Eighteenth Day of October, 1994

*Attest:*

Bruce Lehman

BRUCE LEHMAN

*Attesting Officer*

*Commissioner of Patents and Trademarks*